(12) United States Patent
Svec et al.

(10) Patent No.: US 8,965,193 B1
(45) Date of Patent: Feb. 24, 2015

(54) MIRRORED LENS FOR WIDE FIELD OF VIEW AND WIDE SPECTRUM

(71) Applicants: Christopher B. Svec, Palatine, IL (US); Alan R. Greenland, Palatine, IL (US); Hao C. Tran, Libertyville, IL (US)

(72) Inventors: Christopher B. Svec, Palatine, IL (US); Alan R. Greenland, Palatine, IL (US); Hao C. Tran, Libertyville, IL (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 14/076,870

(22) Filed: Nov. 11, 2013

(51) Int. Cl.
*G03B 7/099* (2014.01)
*G03B 17/00* (2006.01)
*G02B 17/00* (2006.01)
*G02B 5/10* (2006.01)
*G02B 17/08* (2006.01)
*H04N 5/232* (2006.01)

(52) U.S. Cl.
CPC ........ *G02B 17/0856* (2013.01); *H04N 5/23293* (2013.01)
USPC ........... 396/272; 359/366; 359/729; 359/731; 359/859

(58) Field of Classification Search
CPC .. G03B 7/00941; G02B 17/086; G02B 17/08; G02B 17/0804; G02B 17/0808; G02B 17/0888
USPC .......... 396/272, 439; 359/726, 727, 728, 730, 359/858, 863, 864, 869, 366, 729, 731, 859
See application file for complete search history.

(56) References Cited

U.S. PATENT DOCUMENTS

| | | | |
|---|---|---|---|
| 3,529,888 A | | 9/1970 | Buchroeder |
| 4,392,710 A | | 7/1983 | Rogers |
| 2005/0001168 A1 | * | 1/2005 | Amon et al. ................... 250/353 |
| 2013/0329283 A1 | * | 12/2013 | Nakano et al. ................ 359/366 |

\* cited by examiner

*Primary Examiner* — Rochelle-Ann J Blackman
(74) *Attorney, Agent, or Firm* — Tarolli, Sundheim, Covell & Tummino LLP

(57) ABSTRACT

Systems and methods are provided for a solid filled mirrored lens system capable of wider fields of view and wider spectra than current lens systems. The mirrored lens is used to focus light incident upon a right circular cylindrical central body comprising a substantially planar first surface and a substantially planar second surface. A primary reflecting surface is located on the second surface of the central body and shaped as an annulus with a void in the central region of the second surface. Further, a secondary reflecting surface is located in a central region of the first surface facing the primary reflecting surface.

18 Claims, 4 Drawing Sheets

MIRRORED LENS FOR WIDE FIELD OF VIEW AND WIDE SPECTRUM

TECHNICAL FIELD

The present invention relates generally to optics, and more particularly to a mirrored lens for wide field of view and wide spectrum.

BACKGROUND OF THE INVENTION

The purpose of most optical systems is to transmit a magnified image to a collector, with a majority of these systems employing either reflective or refractive lenses. A curved reflective optical system provides better color correction compared to a refractor type lens. Yet a typical curved reflective system is structured with two reflective surfaces facing each other, separated by a gap. Such a reflective system has a limited field of view, as curved reflectors do not correct well for incident light more than 0.5 degrees off axis. Introducing refractive optical elements can increase the field of view. Traditionally, a series of refractive optical elements with varying properties have been combined with reflective lenses to increase field of view. However, as multiple optical elements are used, the lens system becomes complex, increasing both the size and manufacturing cost of the system. Additionally, multiple transition surfaces between air/lens interfaces introduce chromatic aberrations to the magnified image. Chromatic aberrations can be corrected through selection of the material utilized in constructing the optical elements, as well as arranging additional refractive lenses. However, this further complicates the system.

SUMMARY OF THE INVENTION

In accordance with an aspect of the present invention, a compact, simple mirrored lens system is provided with the superior color correction of a reflection type lens as well as the wide field of view of a refraction lens. The mirrored lens system includes a right circular cylindrical central body comprising a substantially planar first surface and a second surface. A primary reflecting surface is located on the second surface of the central body in the shape of an annulus with a void in the central region. A secondary reflecting surface is located in a central region of the first surface facing the primary reflecting surface. The secondary reflecting surface is substantially equal in size to that of the void on the second surface.

In accordance with another aspect of the present invention, the central body is a single, unitary structure made of a solid, transparent material. The material can have an index of refraction greater than the index of refraction of air. The central body can be made of any suitable material, including but not limited to, polymer based compounds, Ge, Si, ZnS, and ZnSe. Depending on the particular application, different materials for the central body may function more effectively in the mirrored lens system.

In accordance with yet another aspect of the present invention, the void on the second surface serves as a refractive corrector exit surface for light transmitted through the mirrored lens. The void can take a parabolic, spherical, or aspherical shape.

In accordance with still another aspect of the present invention, an imaging system that provides a wide angle field of view and superior color correction is provided. The imaging system is located in a housing that includes a mirrored lens to focus incident light, the mirrored lens comprising a right circular cylindrical central body with a substantially planar first surface and a substantially planar second surface. A primary reflecting surface is located on the second surface of the central body in the shape of an annulus with a void in the center region. A secondary reflecting surface is located in a central region of the first surface facing the primary reflecting surface. Behind the mirrored lens is an image detector to receive light focused by the mirrored lens and convert the received light to a digital image. A user interface is also located in the housing to display the digital image.

In accordance with yet another aspect of the present invention, a method is provided for constructing a mirrored lens system that provides a wide field of view and superior color correction. A right circular cylindrical central body is constructed from a single, transparent material with an index of refraction greater than that of air. The cylindrical central body is defined as having substantially planar first surface and a second surface. A parabolic first reflecting surface in the shape of an annulus is created on the second surface of the central body. The center of the first reflecting surface is a transparent void. A second reflecting surface is created on the first surface. The second reflecting surface is created to be substantially the same size and shape as the void of the first reflecting surface. The first and second reflecting surfaces can be created by polishing, coating, or any suitable process now known or later discovered.

BRIEF DESCRIPTION OF THE DRAWINGS

FIG. 1 illustrates an exemplary mirrored lens in accordance with an aspect of the present invention.

FIG. 2 provides a cross-sectional illustration of a mirrored lens system in accordance with an aspect of the present invention.

FIG. 3 illustrates an exemplary imaging system containing a mirrored lens in accordance with an aspect of the present invention.

FIG. 4 illustrates an exemplary methodology for constructing a mirrored lens assembly in accordance with an aspect of the present invention.

DETAILED DESCRIPTION OF INVENTION

Air-filled reflective systems are limited in field of view because typical curved reflectors do not correct chromatic aberration well for incident light more than 0.5 degrees off axis. Filling the space between two reflective surfaces with a material having an index of refraction that is higher than air allows for light incident on the entrance surface to compress wider angled light than a reflective optical system. Thus, wide angle light is compressed at the reflecting surfaces so that the incident angles are closer to on-axis. As the light travels through the high index material, the light can be effectively directed toward and subsequently corrected by the reflective surfaces. The result is a lens that is capable of wider angle fields of view and superior color correction because the angular compression of light traveling through the material is greater than light traveling in air.

Thus, the present invention described herein is a mirrored lens with a combination reflector and refractor type lens, which provides for better color correction than a standalone refractor type lens. The solid mirrored lens allows for a higher refractive index than air allowing the advantages of a reflective lens apparatus while providing several degrees of additional field of view due to the higher refractive index at the reflective surface interface while maintaining a compact and durable construction. The higher index material of the solid mirrored lens allows for wider angles in air to be compressed at the reflective surfaces and still be within the angular limits of correction at the reflective surfaces. Therefore, color correction can be maintained over a broad spectrum, and the mirrored lens can provide a wider field of view than a system separated by air.

The mirrored reflective system achieves additional image adjustment by employing a refractive corrector exit surface. The exit surface can be shaped so as to act as a field flattener or image magnifier while keeping chromatic aberration within the diffraction limit of the mirrored lens. The exit surface is capable of removing nearly all of the axial color introduced at the entrance surface while imparting only a small amount of lateral color.

Figure 1:
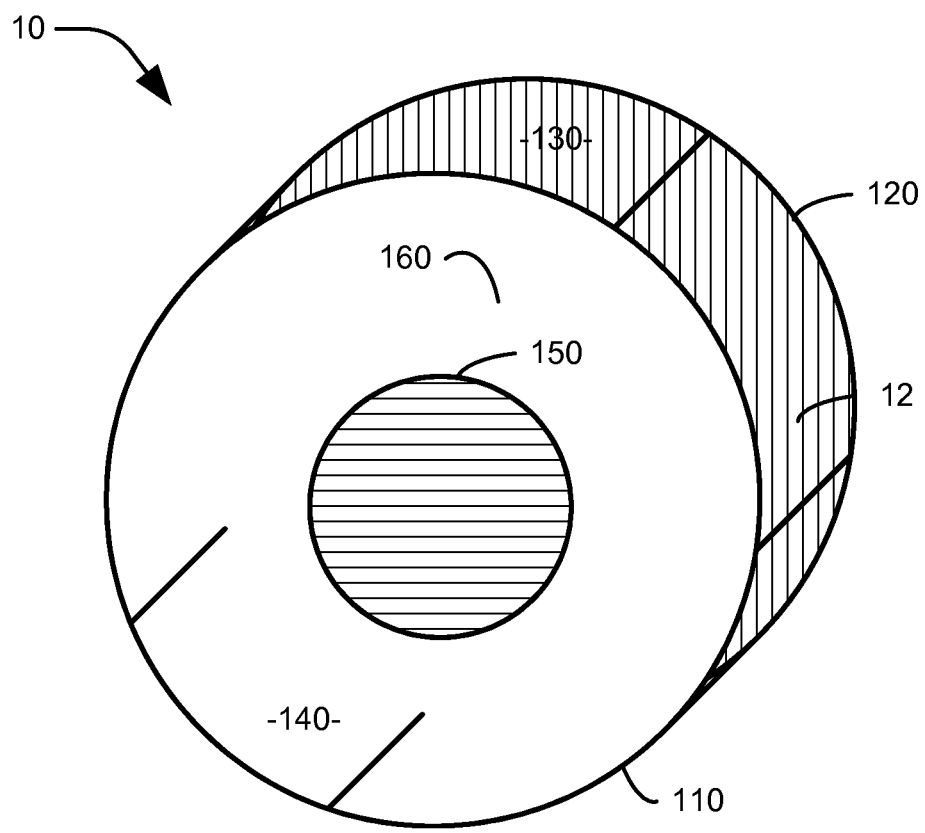

FIG. 1 illustrates an exemplary mirrored lens in accordance with an aspect of the present invention. The lens apparatus is constructed of a solid central body comprised of a material with an index of refraction greater than that of air and takes a generally cylindrical shape. The lens apparatus employs a two mirror reflector system with a primary reflective surface coated on a second surface of the central body and a secondary reflective surface coated onto a first surface of the central body that opposes the second surface. The primary reflective surface has a void at the center region that remains transparent to be used as an exit for propagated light. The primary reflective surface can be substantially planar or can be shaped as a paraboloid and can be treated with a reflective coating. The secondary reflecting surface on the central region of the first surface of the central body can also be treated with a reflective coating and can be shaped as a hyperboloid. The remaining untreated area of the first surface is transparent and generally planar. The secondary reflective surface is approximately equal in size to that of the void located in the center of the primary reflecting surface.

Moreover, the void at the second surface of the solid material can be shaped as a lens (e.g., aspherical, or containing several distortions from an ideal spherical shape) to act as a refractive corrector to better compensate for refractive errors and yield a wider field of view.

Thus, FIG. 1 provides an exemplary mirrored lens system 10 in accordance with an aspect of the present invention. The mirrored lens system 10 is configured to collect light within a wavelength band of interest and provide a focused representation of the collected light to a desired location. A central body 12 having a first surface 110 and a second surface 120 can be constructed from a material having a desired index of refraction. For example, the material can be selected to have a high index of refraction in comparison to air in order to maximize the field of view. Selecting a material with a lower index of refraction would narrow the field of view, and may be employed for a particular application of the mirrored lens system as desired.

A first reflective surface 130 denoted by the vertical hatch marks is applied to the second surface 120 and a second reflective surface 150 denoted by horizontal hatch marks is applied to the first surface 140. Polishing or coating the surface with a reflective treatment may achieve the desired reflective character. The first reflective surface 130 can be shaped as a parabolic annulus, with a central void 160. The second reflective surface 150 can be approximately equal in size to the central void 160. The second reflective surface 150 can be positioned facing the first reflective surface 130 on opposing sides of the central body 12.

It will be appreciated, however, that there is a practical limit to the degree of chromatic correction that can be applied by the mirrored lens using known materials. For a sufficiently large wavelength band of interest, the correction applied by the mirrored lens may not be sufficient to correct the chromatic and achromatic aberrations within an optical system over a desired range of field of view angles. In accordance with an aspect of the present invention, a variety of optical tools can be applied to the exit surface of the central void 160.

In an exemplary implementation of the mirrored lens 10, a diffractive grating (not shown) can be applied by, for example, machining or etching the grating onto the exit void 160, such that the diffractive grating is adjacent to the air interface. Applying the diffraction grating to the surface of the lens allows for an additional measure of structural protection, as the diffractive grating can be relatively fragile. In addition, the exit void (e.g., the central void 160 of the second surface 120) bearing the diffractive grating can be configured to be aspherical, allowing for additional fine tuning of the dispersive properties of the diffractive grating and the mirrored lens 10. For instance, an aspherical coefficient can be applied to the surface at the exit surface of the central void 160 for a combined effect with the mirrored lens 10 to provide chromatic aberration limited performance over a relative wide band of wavelengths, for example, the near to middle infrared or visual band of wavelengths. Accordingly, the mirrored lens 10 can be designed to produce a substantially achromatic response over a wide wavelength band of interest.

In the illustrated implementation, the first reflective surfaces 130 and the second reflective surface 150 can be coated with a reflective coating. In one implementation, the lens is constructed from a first material and the reflective coatings are selected from a second material. The transparent portion of the first surface 110 may also be coated to limit the wavelength of light entering the mirrored lens or to serve as structural protection. The walls of the cylinder comprising a cylindrical band stretching from the first surface 110 to the second surface 120 may also be coated depending on the particular application of the mirrored lens. For example, if the lens is configured as a member of a more complex optical system, it may be helpful to prevent errant light from entering into or escaping from the side of the central body. Thus, a coating with a filter or barrier may be employed.

In another aspect of the present invention, the material comprising the central body 12 is selected to have a relatively gradual variance in refractive index between the first surface 110 and the second surface 120. For example, substantially all or a portion of the central body 12 can be constructed as a gradient index (GRIN) lens to further tailor the compression angle of light as it propagates through the mirrored lens 10.

Figure 2:
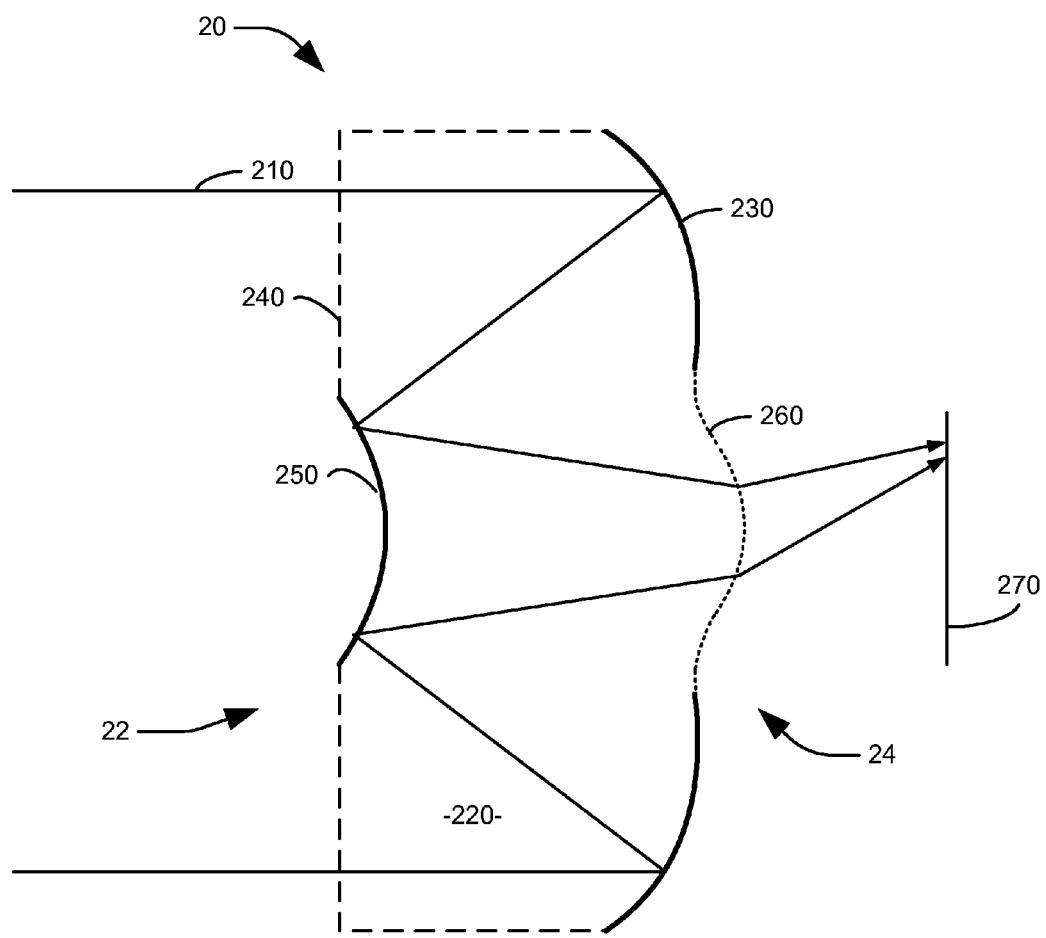

FIG. 2 illustrates a cross section of the mirrored lens 20. In operation, light enters the mirrored lens through the transparent portion of the first surface of the solid material. The light propagates through the material of the central body from the first surface at an angle toward the second surface. As the light reaches the primary reflective surface, the light is reflected back through the central body toward the secondary reflective surface. The light is then reflected from the secondary reflective surface back towards to the second surface. As the light travels through the central body, the light travels at an angle directing it to the void on the second surface. When the light reaches the void, the light exits the mirrored lens through the void in the primary reflective surface. The refractive corrector exit surface at the void can act as a field flattener or image magnifier while keeping the chromatic aberration with the diffraction limit.

As illustrated in FIG. 2, light 210 incident on a transparent first surface 240 is transmitted through the central body 220. As the incident light 210 travels through the central body 220, the index of refraction of the material of the central body 220 focuses the light 210 on the reflective surface 230 of the second surface 24. The light 210 is then reflected back toward the first surface 22 and focused on a central portion of the first surface comprising the second reflective surface 250. The light 210 is then reflected a second time and focused toward the central void 260 of the second surface. There, the light exits the mirrored lens system 20 and is projected onto an image detector 270.

Figure 3:
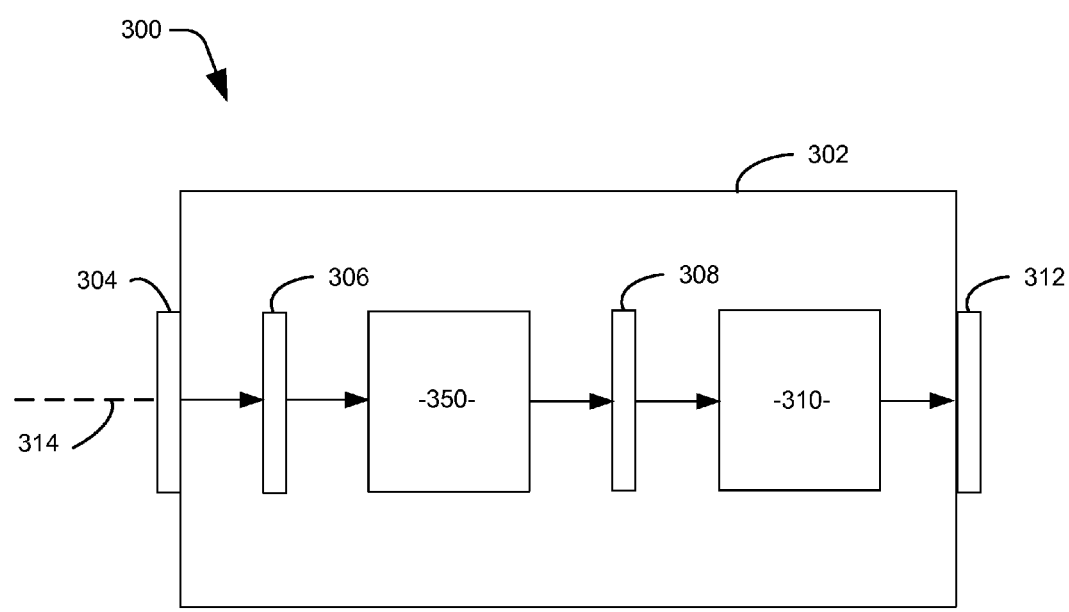

FIG. 3 illustrates an exemplary optical imaging system 300 utilizing the mirrored lens in accordance with an aspect of the present invention. The illustrated system 150 can be used for any of a number of applications in which it is desirable to capture images over the visible spectrum. For example, the system 300 can be mounted in a platform requiring small scale and rugged optical focusing systems (e.g., digital camera, mobile telephone, computer mounted optic, telescope) to provide imaging with wider fields of view than current reflective lens systems, as well as wider spectra than current refractive lens systems.

In the illustrated example, the optical imaging system 300 is configured to provide improved performance within at least the middle infrared to the visual wave band (e.g., wavelengths of 380 nanometers to 12 micrometers). The optical imaging system 300 includes a housing 302 comprising an aperture 304 of about 150 millimeters in diameter. The housing 302 comprises a first surface that collects incident light within a desired range of field angles (e.g., within 2.5 degrees of a longitudinal axis 314 of the mirrored lens 350) at the aperture 304. The mirrored lens 350 is located within the housing 302 and in line with the aperture 304.

In practice, the materials comprising the lens are selected to transmit light with minimal chromatic aberration. An optical filter 306 can be positioned with the aperture 304 to attenuate light outside of the desired band of wavelengths. While the filter 306 is illustrated herein as free standing, the filter 306 can also comprise a coating on the exterior of the mirrored lens 350 within the system 300. In the illustrated implementation, the material comprising the central body is selected to have a relatively high index of refraction to provide a wide field of view.

In operation, light enters the housing 302 through the aperture 304 and filter 306 and travels through the mirrored lens 350 that focuses the captured light onto an image detector 308 (e.g., a focal plane array). The image detector 308 translates the focused light into a digital representation of the image received at the aperture 304. This digital representation can be provided to any of a variety of image processing systems for analysis and display to an operator. Thus, the image generated by the data analysis component 310 can be provided to an associated user interface 312 for display to a user.

Figure 4:
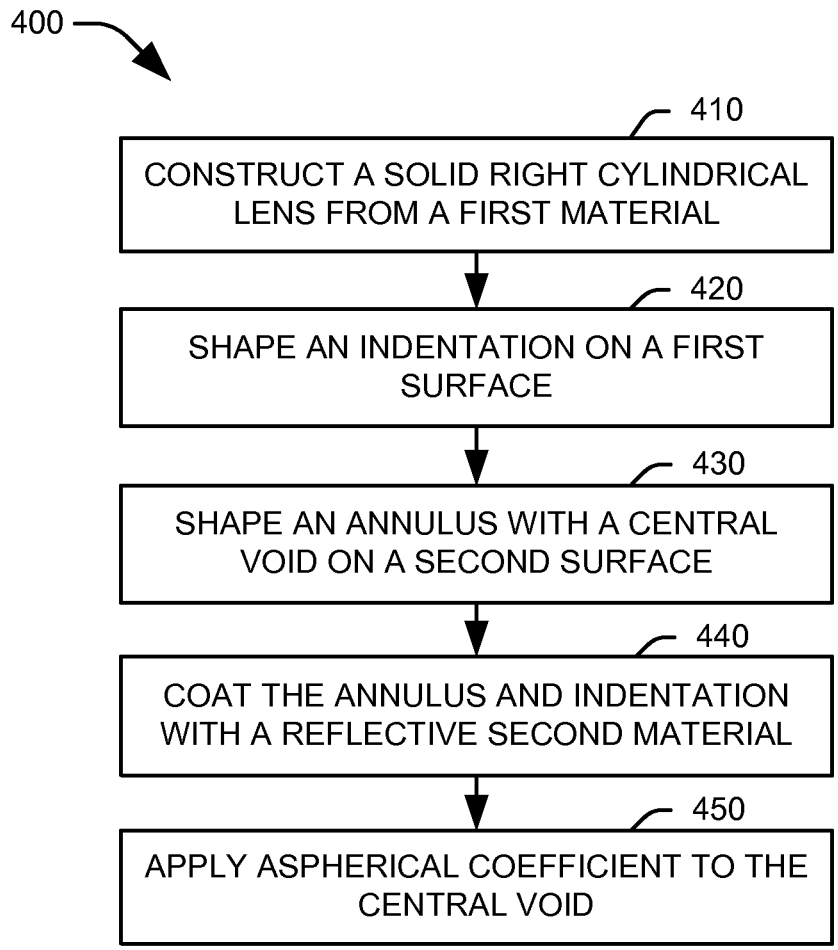

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 4 illustrates an exemplary methodology 400 for constructing a mirrored lens assembly in accordance with an aspect of the present invention. At 410, a central body is constructed from a first material. The first material can be selected to have an index of refraction that is relatively high in comparison to air. Additionally, the material can be one that has an index of refraction that varies as measured from the first surface to a second surface. The central body is formed as a substantially right circular cylinder comprising a substantially planar first surface and a second surface. The body can be formed by injection molding, cutting, or mechanical shaping. In one implementation, the length of the central body is equal to or less than the diameter of the first surface. However, the dimensions of the mirrored lens may be altered to suit the particular design requirements for specific implementations.

At 420, a lens profile, for example a hyperbolic radius of curvature, is applied to the central portion of the first surface, and will become the secondary reflective surface. At 430, another lens profile, for example a parabolic radius of curvature, is applied to the second surface. The parabolic surface is formed in the shape of an annulus with a center area left unaffected. In this example, the parabolic annulus will become the primary reflective surface, and the center area will become the exit void. The radius of curvature applied to the first surface can be equal to the radius of curvature of the second surface or can be different depending on the desired optical characteristics of the lens. Although the lens profile as described in step 420 takes a hyperbolic shape and 430 describes a parabolic aspheric profile, additionally or alternatively, the first and second surfaces can be fashioned as any curved surface. For example, the first and second surfaces can be parabolic, elliptical, splines, hyperbolic, spherical, or any higher order aspherical design.

At 440, a reflective treatment is applied to the parabolic annulus of the second surface and the central portion of the first surface. For example, the surfaces can be coated with a second material. The reflective surfaces are directed inward to the central body, with one facing the other. Note that the portions of the first and second surfaces where no radius of curvature is applied are typically left uncoated. However, the first and second surfaces may alternatively be coated for antireflection. In some embodiments, however, the outer cylindrical band may also be coated. The coating can be the reflective second material or can be a third material with different properties. For example, the third material may be opaque, selected to prevent light from coming into or escaping from the mirrored lens. At 450, an aspherical coefficient is applied to the surface of the central void located on the second surface to provide chromatic correction to the mirrored lens. Additional optical tools may also be applied to the central void to achieve a desired effect.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:
1. A mirrored lens system comprising:
   a substantially right circular cylindrical central body comprising a substantially planar first surface and a second surface;
   a primary reflecting surface located on the second surface of the central body with a void in the center region, wherein the primary reflecting surface is in the shape of a parabolic annulus with a first radius of curvature and the void is a refractive corrector exit surface shaped as an aspherical lens; and a secondary reflecting surface located in a central region of the first surface and facing the primary reflecting surface.

2. The system of claim 1, wherein the central body is solid and made of a substantially transparent material having an index of refraction greater than the index of refraction of air.

3. The system of claim 1, wherein the secondary reflecting surface is substantially equal in size to the void in the central region of the primary reflecting surface.

4. The system of claim 1, wherein the secondary reflecting surface is in the shape of a hyperbolic indentation with a second radius of curvature.

5. The system of claim 4, wherein the radius of curvature of the primary reflecting surface is different from the radius of curvature of the secondary reflecting surface.

6. The system of claim 1, wherein the first surface is operative to collect light at an angle of about 5 degrees off axis.

7. The system of claim 1, wherein the transparent material comprises one of zinc sulfide, zinc selenide, germanium, glass and plastic.

8. An imaging system, comprising:
a mirrored lens as set forth in claim 1;
a data analysis component that reconciles data provided from the mirrored lens to provide a sensor image; and
a user interface that displays the sensor image.

9. An imaging system, comprising:
a mirrored lens that focuses incident light, comprising;
a right circular cylindrical central body comprising a substantially planar first surface and a substantially planar second surface;
a primary reflecting surface located on the second surface of the central body, wherein the primary reflecting surface is in the shape of a parabolic annulus with a first radius of curvature and with a transparent void in the center region shaped as an aspherical lens;
a secondary reflecting surface located in a central region of the first surface and facing the primary reflecting surface, wherein the portion of the first surface surrounding the secondary reflecting surface is transparent;
an image detector that receives light focused by the mirrored lens and converts the received light to a digital image; and
a user interface that displays the digital image.

10. The system of claim 9, further comprising a filter applied to the transparent portion of the first surface that attenuates incident light having wavelengths outside of the desired wavelength band.

11. The system of claim 9, wherein a diffraction grating is applied to at least one of the transparent portion of the first surface and the transparent void of the second surface.

12. The system of claim 9, wherein the central body is solid, unitary structure and made of a substantially transparent material having an index of refraction greater than the index of refraction of air.

13. The system of claim 12, wherein the transparent material comprises one of zinc sulfide, zinc selenide, germanium, and plastic.

14. The system of claim 9 further comprising a cylindrical band of the right circular cylindrical central body coated with an opaque material.

15. A method for constructing a mirrored lens comprising:
constructing a solid right cylindrical lens from a first material;
shaping a hyperbolic indentation on a first surface;
shaping a parabolic annulus with a first radius of curvature having a central void on a second surface;
coating the parabolic annulus and the hyperbolic indentation with a reflective second material; and
applying an aspherical coefficient to the central void.

16. The method of claim 15 further comprising etching or machining a diffraction grating onto a surface of the mirrored lens.

17. The method of claim 15, wherein the first material is zinc selenide.

18. The method of claim 15, further comprising coating the cylindrical band with an opaque material.

* * * * *